E. E. QUIMBY.
MACHINE FOR MAKING WOOD SCREWS.

No. 186,754. Patented Jan. 30, 1877.

FIGURE 1.

Witnesses:
Edw. d Payson
Geo. W. Miatt

Inventor:
Edw. E. Quimby

E. E. QUIMBY.
MACHINE FOR MAKING WOOD SCREWS.

No. 186,754. Patented Jan. 30, 1877.

Witnesses:
Edw. K. Payson
Geo. W. Miatt

Inventor:
Edw. E. Quimby

E. E. QUIMBY.
MACHINE FOR MAKING WOOD SCREWS.

No. 186,754. Patented Jan. 30, 1877.

Witnesses:
Edw.d Payson
Geo. W. Miatt

Inventor:
Edw. E. Quimby

E. E. QUIMBY.
MACHINE FOR MAKING WOOD SCREWS.

No. 186,754. Patented Jan. 30, 1877.

Witnesses:
Edw⁴ Payson
Geo. H. Miath

Inventor:
Edw. E. Quimby.

UNITED STATES PATENT OFFICE.

EDWARD E. QUIMBY, OF ORANGE, NEW JERSEY, ASSIGNOR TO AMERICAN SCREW COMPANY, OF PROVIDENCE, RHODE ISLAND.

IMPROVEMENT IN MACHINES FOR MAKING WOOD-SCREWS.

Specification forming part of Letters Patent No. 186,754, dated January 30, 1877; application filed November 21, 1876.

*To all whom it may concern:*

Be it known that I, EDWARD E. QUIMBY, of Orange, New Jersey, have invented certain Improvements in Combined Shaving, Nicking, and Threading Machines, for Manufacturing Wood-Screws, of which the following is a specification:

My invention consists, first, in the organization, in a single machine, of devices, respectively, for shaving the heads of screw-blanks, nicking the heads of screw-blanks, and threading screw-blanks; secondly, in the combination of these several devices with a receptacle which holds and presents in proper position each one of an indefinite series of blanks and a conveyer or transferrer, by the operation of which the blanks are successively taken from the said receptacle, and are transferred in due order to the shaving, nicking, and threading devices; thirdly, in the combination of devices for griping a screw-blank, with an automatic discharger, by the operation of which the blank is at the proper time withdrawn from the griping device, and delivered in prescribed position to another receptacle; fourthly, in special features relating to my transferring device, in which the blanks are held in proper position by magnetic attraction, derived from magnets arranged in suitable position in a carrier having intermittent reciprocating motions in two directions.

My magnetic carrier itself forms the subject of my application for a patent filed October 25, 1876; but in my present invention my magnetic carrier is combined with receptacles for holding and presenting screw-blanks in prescribed position, and is also combined with a receptacle in which a blank is held in the required position by a magnet, which is stationary, and, finally, is combined with receptacles in which the carrier inserts blanks in prescribed position.

That portion of my invention which is embodied in the combination of my magnetic carrier with receptacles for holding objects in prescribed position is applicable, of course, to a variety of purposes. It will be found useful in any case where a series of iron or steel objects are required to be automatically fed in prescribed position to devices which perform some mechanical operation upon them.

Finally, my present invention exhibits my magnetic carrier in combination with devices for preserving the energy of the magnets. These devices are either stationary or movable keepers, armatures, or auxiliary magnets, arranged with reference to the moving parts of the machine, so that they connect the opposite poles of each magnet, respectively, during the period that the magnets are not required to act as transferrers.

Referring to the drawings, A indicates the bed-plate. $A^1\ A^2\ A^3\ A^4\ A^5\ A^6$ indicate the various upright standards which afford bearings for the shafts, slide-bars, &c. The cam-shaft $a$ makes one complete revolution during the period occupied in finishing a single screw. This shaft has mounted upon it cams for the following purposes, namely: B, for imparting an intermittent reciprocating sliding motion to the magnet-shaft M; C, for rocking the magnet-shaft; D, for opening and closing the shaver-jaws $d$; E, for feeding the nicking-saw $e$ up to the blank, which it effects by means of the slide-bar $e^1$; F, for giving the sliding motions or lead to the chaser or threading-tool $f^1$; G, for giving an intermittent reciprocating sliding motion to the revolving screw-driver $g^1$; H, for governing the rocking motion of the hollow chaser-shaft $h^1$, and controlling the depth of the successive cuts in the threading operation.

I deem it unnecessary to give a detailed description of my cams, as they are of familiar forms, and their shape is so clearly shown in the drawings that any mechanic will understand their construction and mode of operation.

Figure 6:
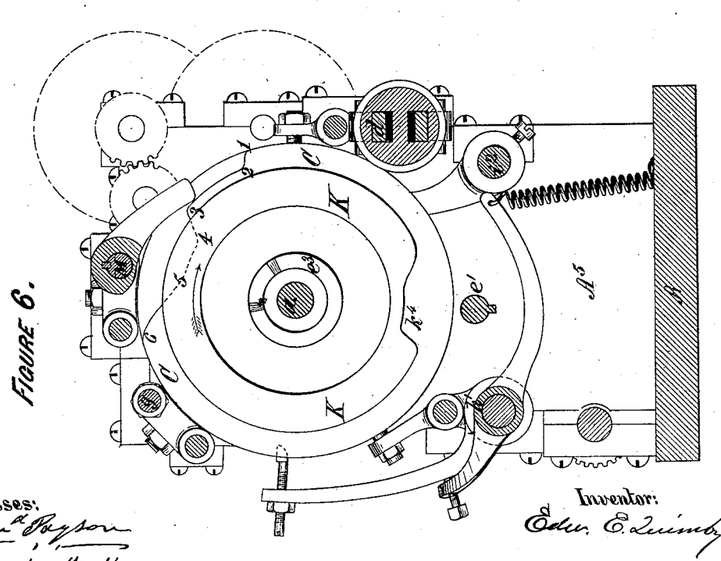
Fig. 6 is a transverse vertical section through the line $y\ y$ on Fig. 2.
Figure 7:
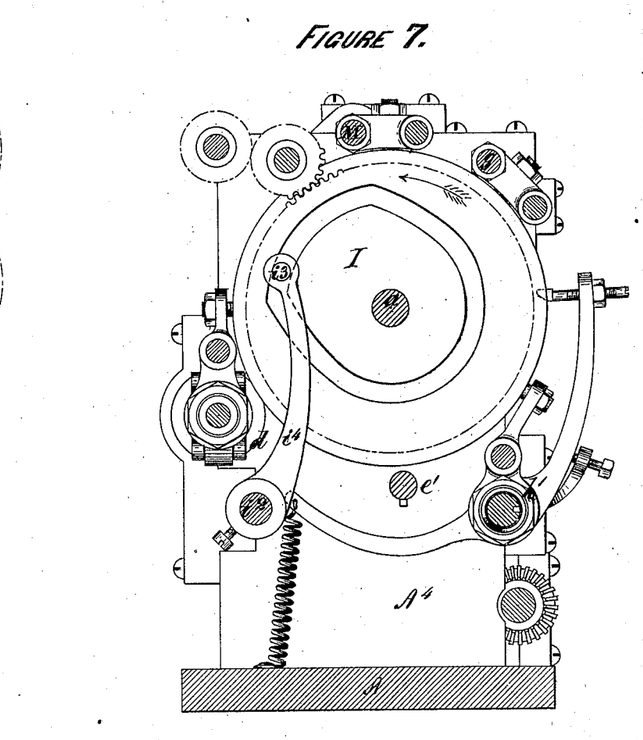
Fig. 7 is a transverse vertical section through the line $z\ z$ on Figs. 1 and 2, looking toward the front of the machine.

The shaver-tool $i$ is secured in the tool-post $i^1$ mounted on the rock-shaft $i^2$, the rocking of which is effected by a cam, I, on the face of the gear, at the rear end of the cam-shaft. (See Fig. 7.) The cam I engages a pin, $i^3$, on the rock-shaft arm $i^4$. The movable nicker-jaw $e^2$, which is opened by a spring, is closed by the cam $e^3$, (shown in Fig. 6,) on the front face of the cam C. The threader jaw or holder or back-rest $k$, also opened by a spring, is closed by the cam K, (shown in Fig. 6,) on the front face of the cam C.

The ways $l$ for holding a series of blanks by their heads are inclined parallel bars, curved downward at the end toward the magnet-carrier $m$, and made of brass or some other non-magnetic substance, except at the lower end, where each bar has an iron shoe, $n\ n^1$, immediately underneath which is a horse-shoe magnet, $n^2$, so placed that the shoes $n\ n^1$ bear upon its opposite poles. When the end blank of the series is released, by the movement of the check-bar O, which derives a reciprocating sliding motion from the sway-bar $o$ affixed to a hub on the magnet-shaft M, the blank so released slides down by its own gravity, and its shank lodges upon the shoes $n$ and $n^1$. In this position it completes the magnetic circuit—that is, in conjunction with the shoes $n$ and $n^1$, it connects the poles of the magnet $n^2$ like an armature or keeper. The blank is thus held in position by magnetic attraction, so that its head projects outward in suitable position to meet the first transferring-magnet $m^1$. This exhibits that feature of my invention which consists in holding small iron or steel objects by means of a magnet which is stationary, in suitable position to be taken up and withdrawn from the stationary magnet by another magnet, which is movable.

It will be seen that the magnet-holder carries three magnets, $m^1\ m^2\ m^3$. The magnet-holder is made of brass or some other non-magnetic material, and has three sets of shoes, $m^{11}\ m^{22}\ m^{33}$, for the three magnets respectively. The shoes for each magnet consist of two angle-pieces of soft iron, upon which the legs or poles of the magnet respectively rest. These angle-pieces are separated from each other by a short interval, and constitute together what I call a divided armature. Objects to be carried by the magnet are presented in suitable position to acquire contact with both of the shoes. The shoes are recessed or otherwise shaped to conform to the shape of that part of the object carried which comes in contact with the shoes. For example, the shoes $m^{22}$ and $m^{33}$ of the magnets $m^2$ and $m^3$ are slightly countersunk, to correspond to the shape of the heads of shaved screw-blanks, which are slightly conical. This formation of the shoes into the shape of the object to be seized is fully described in my application for a patent filed October 25, 1876, to which I have already referred.

Figures 2, 3:
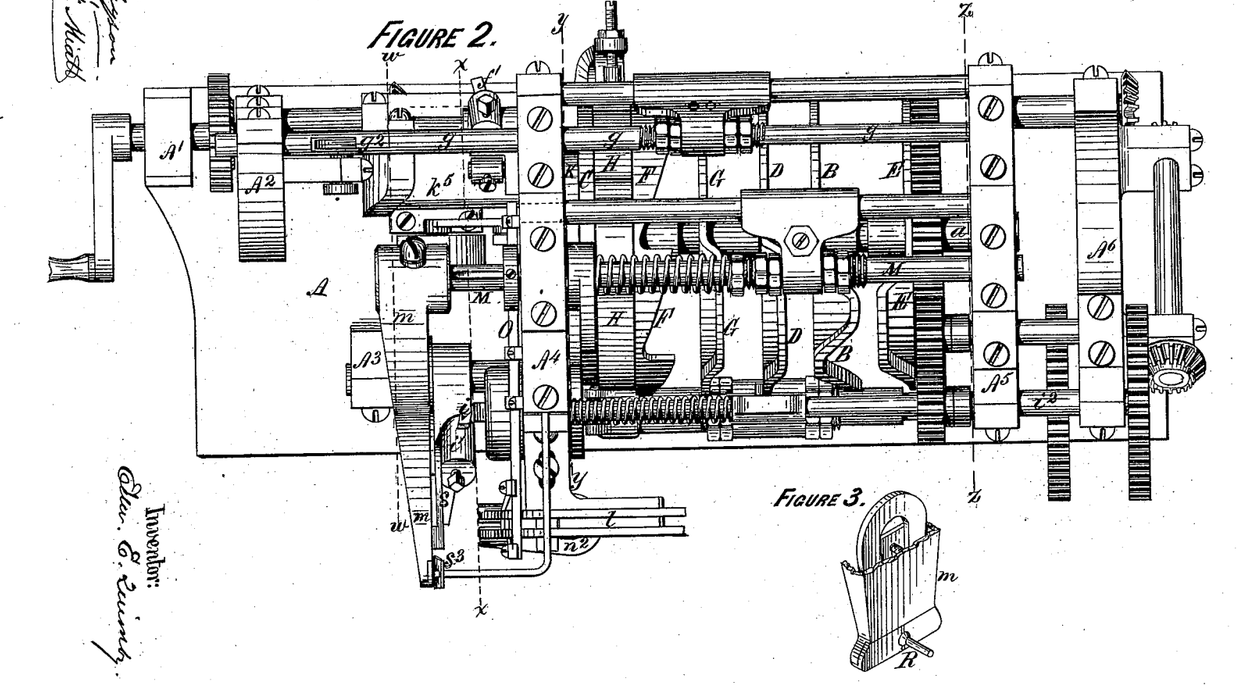
Fig. 2 is a top view.
Fig. 3 is a perspective view of part of the magnet-carrier, showing the mode of holding blanks by the head by magnetic adhesion.

In the case of the magnet $n^2$ the shank of the blank rests on the shoes $n$ and $n^1$, but the transferring-magnets take the blanks by the head, as shown in Fig. 3 at R. The head of the blank reaches across the space between the shoes, and completes the connection between the poles of the magnet resting in its seat on the other side of the magnet-holder. As the heads of the shaved blanks are slightly conical, the edges of the heads only touch the shoes. The object of countersinking the shoes is to insure this, so that the blanks, having an equal connection with both shoes, will be held firmly, and will stand out at right angles. The magnet-holder is arranged so that the divided armatures or shoes of the several magnets will stand exactly opposite the three sets of jaws, or two of the sets of jaws, and the end of the ways.

Figure 1:
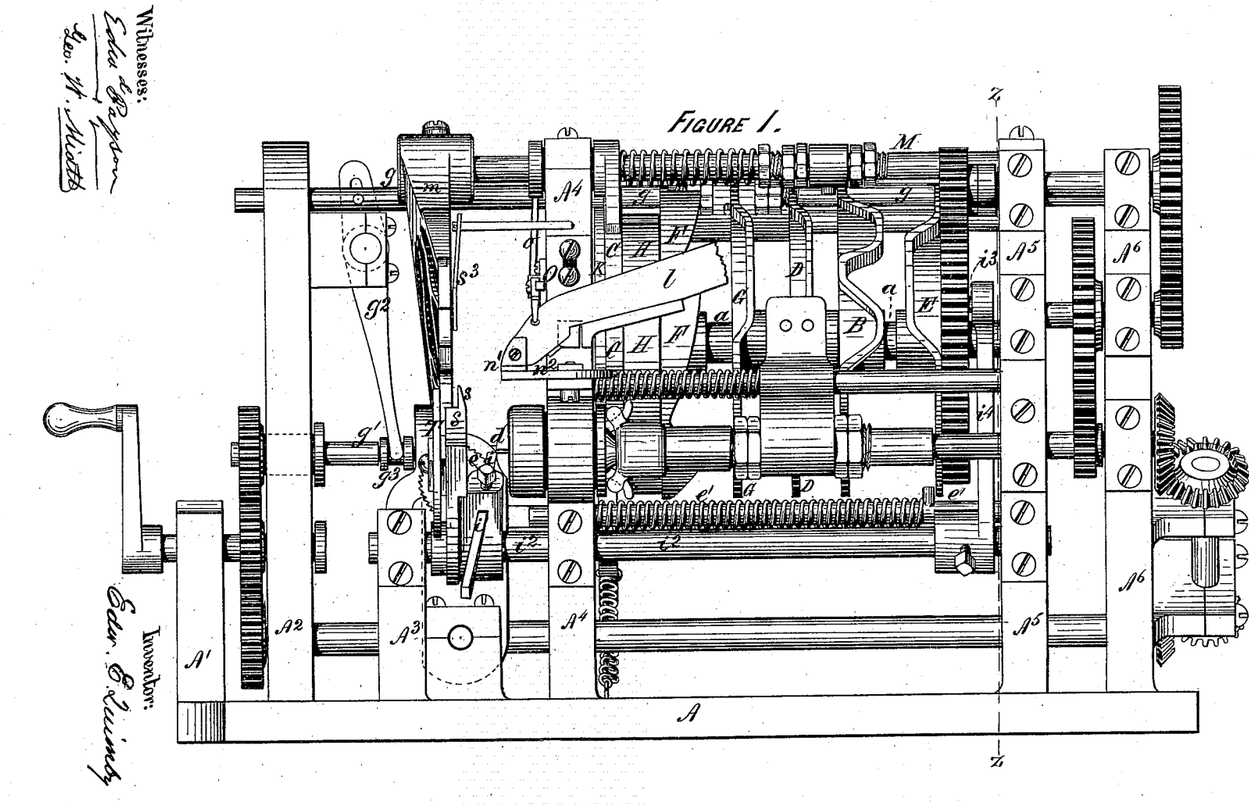
Figure 1 is a side elevation of my machine.
Figure 15:
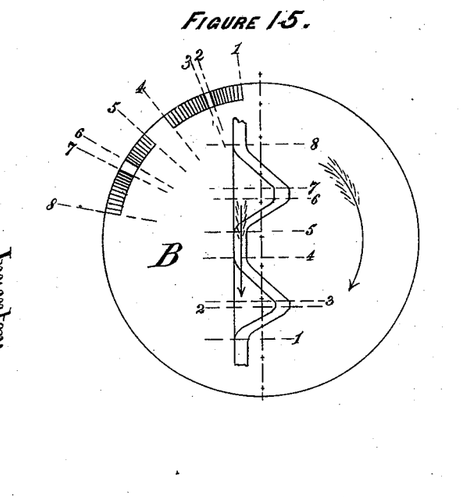
Fig. 15, similar views of the cam B, for sliding the magnet-shaft back and forth.
Figure 16:
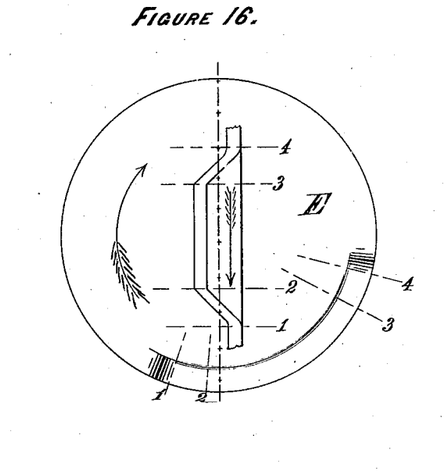
Fig. 16, similar views of the nicker-saw cam E.

The feeding operation is as follows: The magnet-holder during the cutting operation has been swung upward and held out of the way of the saw-frame, &c., in the position shown in Fig. 4. When the cutting operations are completed, the threader-jaw opens and the finished screw drops out, the saw-frame swings backward, and the shaver-tool post rocks backward, leaving the path clear for the motion of the magnet-holder. By the rotation of the cam C, from 1 to 2, (see Fig. 6,) the magnet-holder is so swung downward as to bring the magnet-shoes $m^{11}\ m^{22}\ m^{33}$ in line, respectively, with the blank presented at the lower end of the ways and with the shaver-jaws and nicker-jaws. By the action of the cam B from 1 to 2, (see Fig. 15,) the magnet-holder is then drawn inward, and the magnet $m^1$, or, rather, its shoes $m^{11}$, are brought against the head of the blank at the bottom of the ways, while the magnet-shoes $m^{22}$ are brought against the head of the blank in the shaver-jaws, and the magnet-shoes $m^{33}$ against the blank in the nicker-jaws. These jaws are now opened by their respective cams, and the magnet-holder is then moved outward by the rotation of the cam B from 3 to 4, and draws the blanks out of their respective receptacles, holding them by their heads. Then the magnet-shaft M is so rocked over by the cam C rotating from 3 to 4 as to bring the three magnets opposite the three sets of jaws. The holder is now again drawn inward by the rotation of the cam B from 5 to 6, and thus delivers and inserts the three blanks into the shaver, nicker, and threader jaws, respectively. The jaws then close, and the magnet-shaft is rocked backward by the cam C rotating from 5 to 6, so that the shoes slide sidewise off the heads of the blanks, and leave them in their respective jaws. Having slid clear off the blanks, the magnets are then carried outward by the sliding outward of the magnet-shaft in obedience to the rotation of the cam B from 7 to 8, and the shaver-tool then rocks up and shaves the head of the blank revolving in the shaver-jaws, the saw is fed up and cuts the nick in the head of the blank in the nicking-jaws, and the threading tool or chaser rocks in and cuts the thread of the blank in the threader-jaws. The blank is revolved in the threader-jaws by the revolving screw-driver $g^1$, Fig. 1, which slides in and engages the nick in the head of the blank in obedience to the motion of the cam G transmitted through the slide-bar $g$ and the rocking lever $g^2$, the lower end of which is forked, and embraces the recessed collar $g^3$ on the shank of the screw-driver. The several motions of the parts enumerated are derived from their respective cams, which are timed to effect these motions in due progression.

Figure 4:
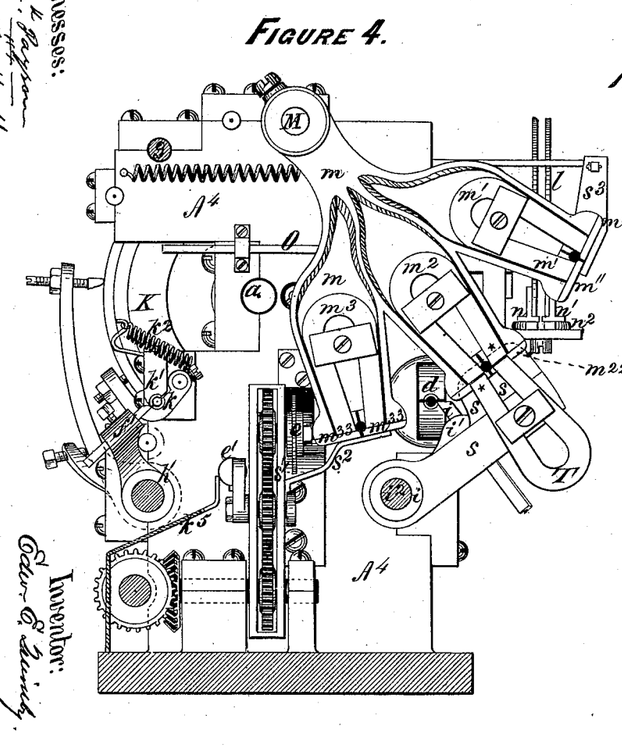
Fig. 4 is a transverse vertical section through the line $w\ w$ on Fig. 2, excepting that the magnetic carrier is shown in full.
Figure 5:
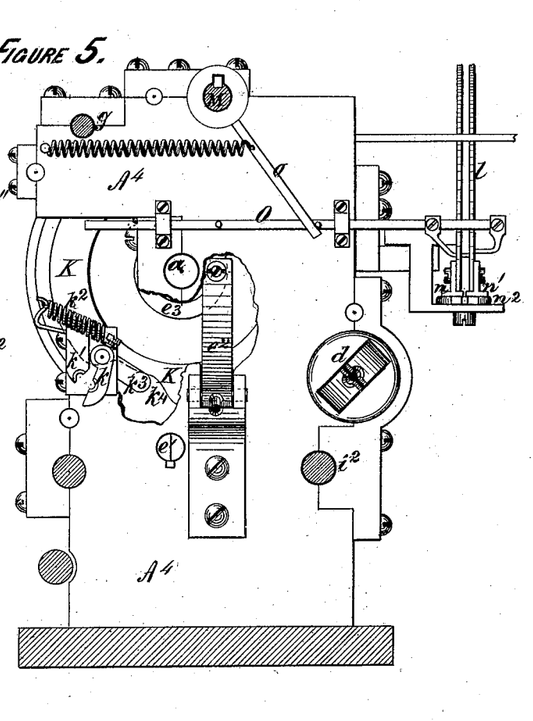
Fig. 5 is a transverse vertical section through the line $x\ x$ on Fig. 2, having a portion of the frame broken out, and portions of the threading and sawing mechanism (fully shown in Fig. 4) omitted, to more clearly exhibit the nicker jaws and cam, and the cam for operating the back rest or movable part of the threading-jaws.

The shaving, nicking, and threading mechanisms employed in my machine are similar to those employed in other machines, and do not require special description, with the exception of the holder, which contains the blank during the threading operation. This holder consists of a rocking-jaw or back-rest, $k$, and a stationary jaw, $k^1$. (See Fig. 4.) When these jaws are closed they completely surround that part of the shank of the blank which is next to the head, and upon which no thread is to be cut. They are cut away, however, to afford the point of the chasing-tool access to the other part of the shank, upon which the thread is to be cut. The threader-jaws are opened for the discharge of the finished screw, as shown in Fig. 5, by the pull of the spring $k^2$, as the crank-pin $k^3$ enters the recess $k^4$ in the periphery of the cam K, as shown in Fig. 5. The front face of the threader-jaws is countersunk to receive the beveled under side of the screw-blank, as indicated in Figs. 4 and 5.

It will be seen that my transferring device is an automatic discharger of the blanks from the shaving and nicking jaws. By the operation of my automatic discharger a blank is withdrawn from the jaws in which it has been griped during the cutting operation, and is delivered in prescribed position to another receptacle.

It will be obvious that this other receptacle may either be another pair of jaws in which the blank is to be subjected to another cutting operation, or it may be a receptacle intended only to receive and detach the blank from the automatic discharger, and then drop the blank into a containing vessel, or upon a part of the table or bed-plate of the machine, which is so situated as to be out of the way of the chips or cuttings. For example, the threading mechanism might be dispensed with, and the jaws $k$ and $k^1$ be used merely to receive the blank from the transferrer and drop it on the inclined shield $k^5$, Fig. 4. In this case, when the jaws $k$ and $k^1$ are opened, the shaved and nicked blank would fall upon one side of the machine, instead of falling into the cuttings under the nicker-saw.

In employing magnetism for automatic feeding devices it is important that provision should be made for preserving the energy of the magnets and for protecting the magnets and their shoes from iron cuttings or chips, which would otherwise be attracted to and adhere to the face of the shoes. The energy of the magnets may be preserved by organizing the structure so that keepers or armatures will be applied to the poles of the respective magnets, during the period when the magnets are not in operation as carriers. The application of keepers not only preserves the energy of the magnets, but for the time being lessens the attraction of the magnets for other objects. A more effectual way, however, of guarding against the adhesion of chips or cuttings to the shoes or magnets is to interpose between the magnets and the cutting mechanisms a shield of some non-magnetic substance. This method of protection is illustrated by the shield $s$, which, being attached to the shaver-tool post $i$, is moved up when the tool-post rocks in, and is thus interposed between the shoes of the magnet $m^2$ and the shaving mechanism. This shield may be made of some non-magnetic material, such as brass or wood, or it may be made of iron, and be brought into contact with the surface of the shoes $m^{22}$, so as to act as an armature or keeper connecting the two poles of the magnet $m^2$. The latter case presents an example of a movable keeper brought into contact with the poles of the magnet or with the shoes prior to the commencement of the cutting operation, and removed from the shoes at the conclusion of the cutting operation, to allow the magnet to perform its functions as a carrier.

A movable keeper, $s^2$, is also shown in Fig. 4, attached to the side of the saw-frame $s^1$, and swinging up with the saw-frame so as to engage the under side of the shoes $m^{33}$ during the sawing operation. Still another mode of arranging the keeper is shown in Fig. 4, in which the keeper is a flat plate of iron, $s^3$, loosely suspended in suitable position to be attracted to and adhere to the face of the shoes $m^{11}$, when the magnet-holder is at rest.

It will be seen that these keepers are brought into contact with the shoes when the magnet-carrier $m$ occupies the position shown in Fig. 4, in which position it remains during the cutting operation.

Figure 8:
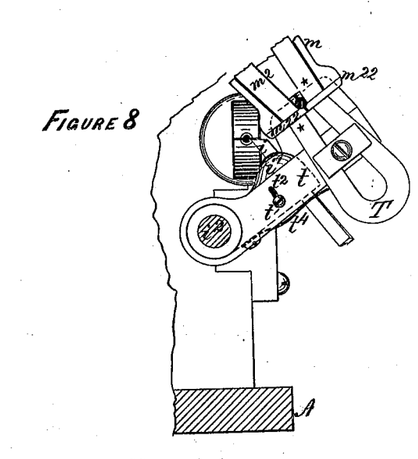
Figs. 8 and 9 are, respectively, end and side elevations, exhibiting an alternative method of using auxiliary magnets.
Figure 9:
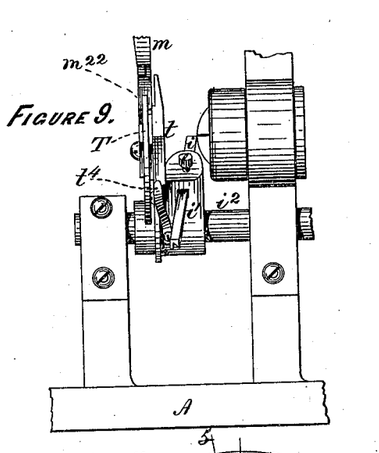
Figures 10, 11, 12:
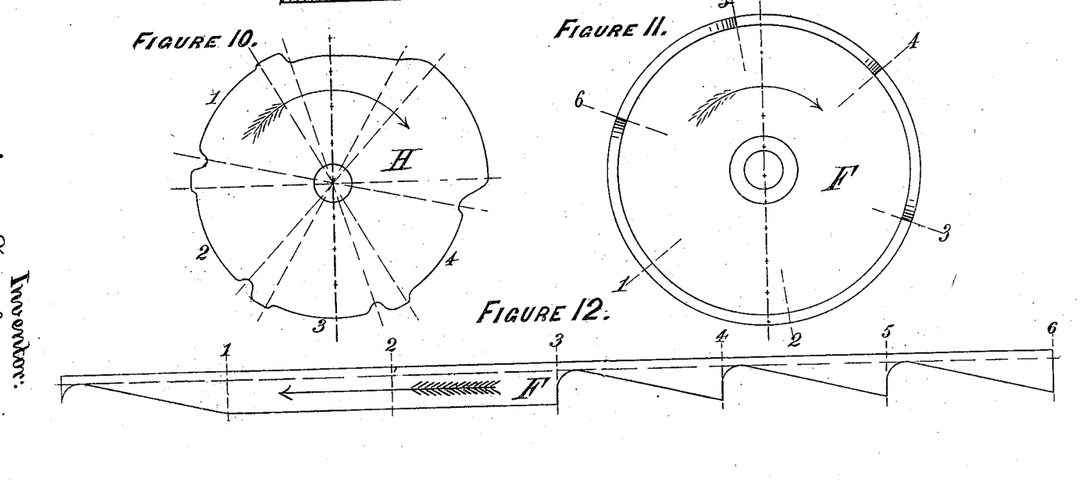
Fig. 10 is a side view of the cam H, for governing the successive cuts of the threading-tool.
Fig. 11 is a side view of the cam F, for giving the lead to the threading-tool.
Fig. 12 is a projection of the periphery of the cam F.
Figure 13:
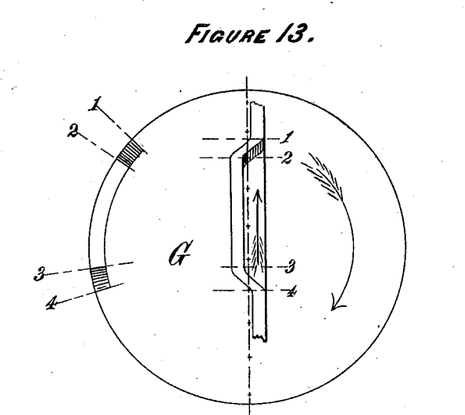
Fig. 13 is a face view and portion of the periphery of the screw-driver cam G.
Figure 14:
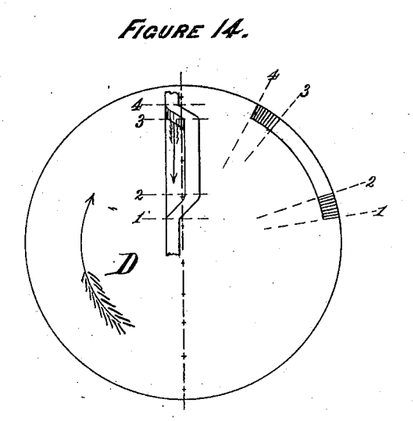
Fig. 14 exhibits similar views of the shaver-jaw cam D.

Another mode of preserving the energy of the magnets is to apply auxiliary magnets to them when they are not in use. An example of this is exhibited in the auxiliary magnet T, which is affixed to the front side of the shield $s$ in position to slide over the front side of the shoes $m^{22}$, as shown. The positive poles of the magnet $m^2$ and the auxiliary magnet T are each indicated by a star, and the magnets, of course, are brought together with their poles reversed. An alternative method of employing this auxiliary magnet is shown in Figs. 8 and 9, where the magnet T is so arranged that its ends abut directly upon the under face of the shoes $m^{22}$. In this case the magnet T is affixed to an arm, $t$, loosely hung upon the shaver tool-shaft $i^2$. The arm $t$ is maintained in connection with the tool-post by means of the pin $t^1$, which enters through the slot $t^2$ in the arm $t$, and is screwed into the shaver tool-post. A spring, $t^4$, affixed to the shaver tool-post, presses the arm $t$ upward, but yields to allow the arm $t$ to remain stationary after the auxiliary magnet has been brought into contact with the shoes $m^{22}$, while the shaver tool-post is continuing to rock inward.

It is important that the armatures shall be separated from the magnets by a sliding motion, preferably from one pole toward the other. Pulling the armatures directly away from both poles tends to dissipate the energy of the magnet.

It will be seen that my machine is so arranged that the separation of the magnets from their armatures, as well as from the screw-blanks, which act as keepers while being transferred, is automatically effected by this desirable sliding motion in all cases.

I am engaged in perfecting magnetic feeding-machines for shaving and nicking large screws, and for threading such screws, there being no economy in combining the three operations of shaving, nicking, and threading, except in making small sizes of screws, when the three operations, respectively, occupy about the same length of time.

I claim as my invention—

1. The combination of mechanism for shaving, nicking, and threading screw-blanks, acting synchronously, with devices for synchronously transferring the blanks from one of the several sets of mechanism named to the other, substantially as set forth.

2. Griping-jaws for holding a screw-blank during the performance upon it of the cutting operation, in combination with a discharging device operating to withdraw the blank from the griping-jaws at the conclusion of the cutting operation, and deposit it in prescribed position in another receptacle, substantially as described.

3. A revolving screw-driver, having an intermittent reciprocating sliding motion, and a holder, composed of the fixed jaw $k^1$, and the vibrating jaw $k$, in combination with a transferring and delivering device for inserting the shank of a screw-blank into the holder when the vibrating jaw has closed against the fixed jaw, substantially as described.

4. A magnet-holder, composed of some non-magnetic material, provided with clamps for holding one or more detachable magnets, and provided with iron or steel shoes for affording bearings to the opposite poles of such magnet or magnets, substantially as set forth.

5. The combination of a magnet or magnets having prescribed compound motions, with a receptacle or receptacles for holding small objects in prescribed position, and operating to withdraw such objects from such receptacle or receptacles, and transfer and deliver such objects in prescribed position to another receptacle or receptacles.

6. The combination of a stationary magnet for holding and insuring the correct presentation of a small object of iron or steel, with a movable magnet operating to withdraw such object from the stationary magnet, 7. A magnetic feeding device, substantially such as described, so arranged with reference to a receptacle, in which it is required to insert a small object of iron or steel, that it will detach itself from said object, after such insertion, by a sliding motion, substantially as and for the purposes set forth.

8. A magnet having prescribed motions and arranged with relation to mechanism for performing cutting operations upon iron or steel objects, to act as a feeding or transferring device, in combination with armature suspended in suitable position to be attracted to the poles of the magnet when the magnet is stationary during period while the cutting operations are going on.

9. A magnet, having prescribed motions, and arranged with relation to mechanism for performing cutting operations upon iron or steel objects, to act as a feeding or transferring device, in combination with a movable armature operating to move against and connect the poles of the magnet when the magnet is stationary during the performance of the cutting operation.

10. The combination of a magnet or magnets contained in a holder, having prescribed motions, and arranged with relation to mechanism for performing cutting operations upon iron or steel objects, substantially in the manner described, with an auxiliary magnet or magnets, as and for the purpose set forth.

11. A magnet or magnets contained in a holder, having prescribed motions, and arranged, substantially as described, with reference to jaws for holding small objects of iron or steel during their subjection to cutting operations, in combination with a shield interposed between the magnet or magnets and the cutting mechanism, for the purpose of preventing any flying metallic cuttings from coming in contact with the magnet or magnets, or with the shoes applied to the poles of the magnet or magnets.

EDW. E. QUIMBY.

Witnesses:
GEO. F. ROOT,
MARY L. ADAMS.